UNITED STATES PATENT OFFICE.

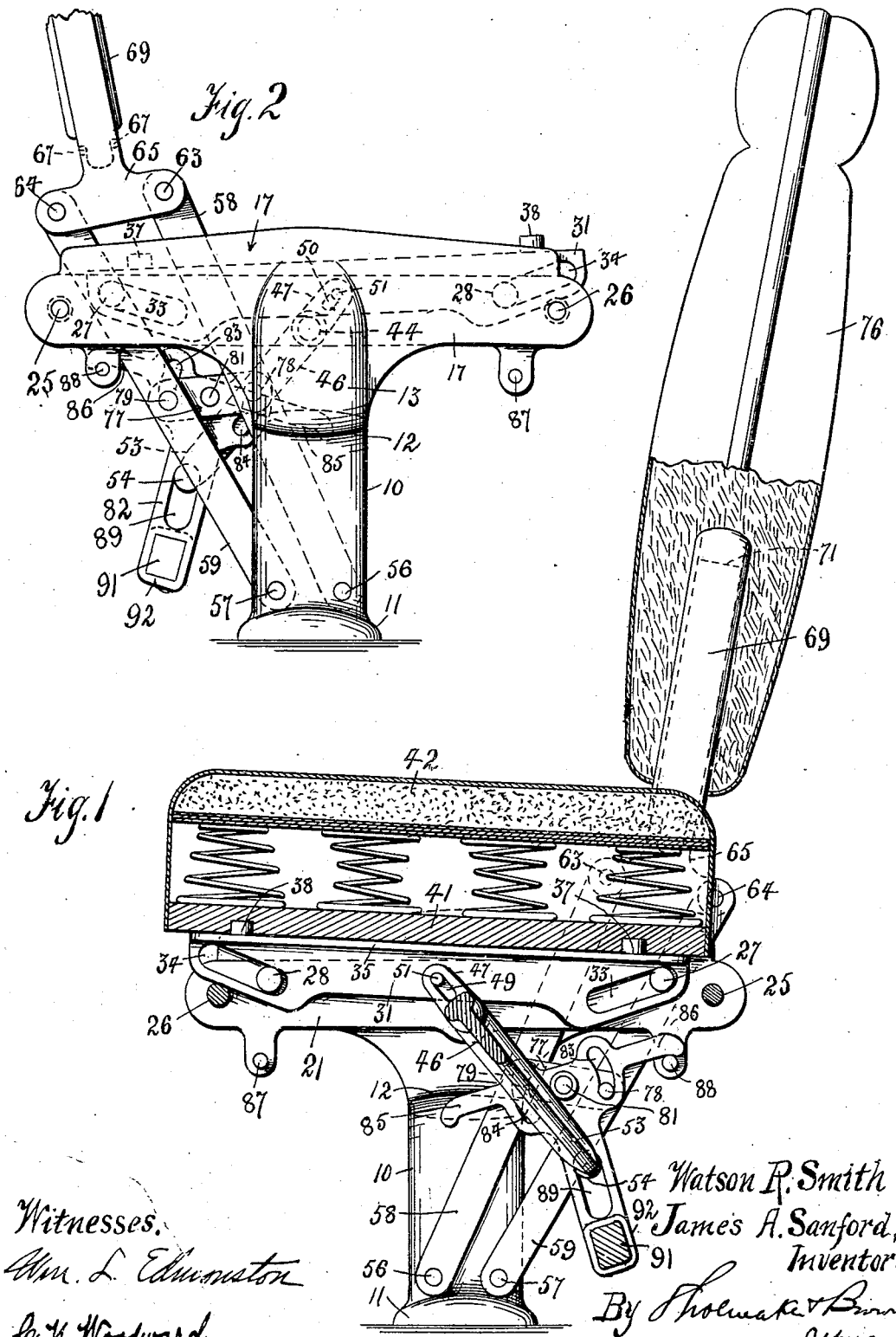

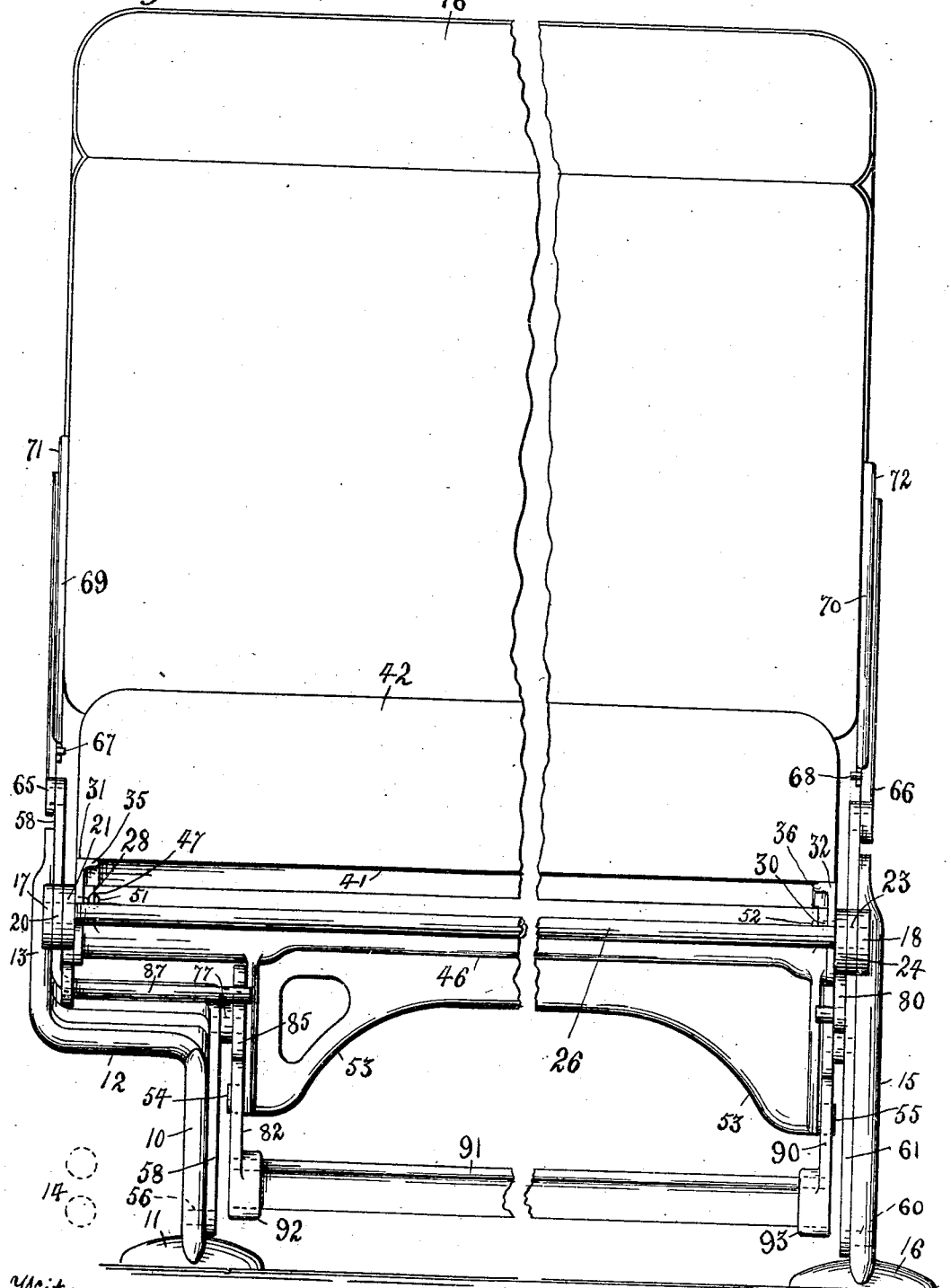

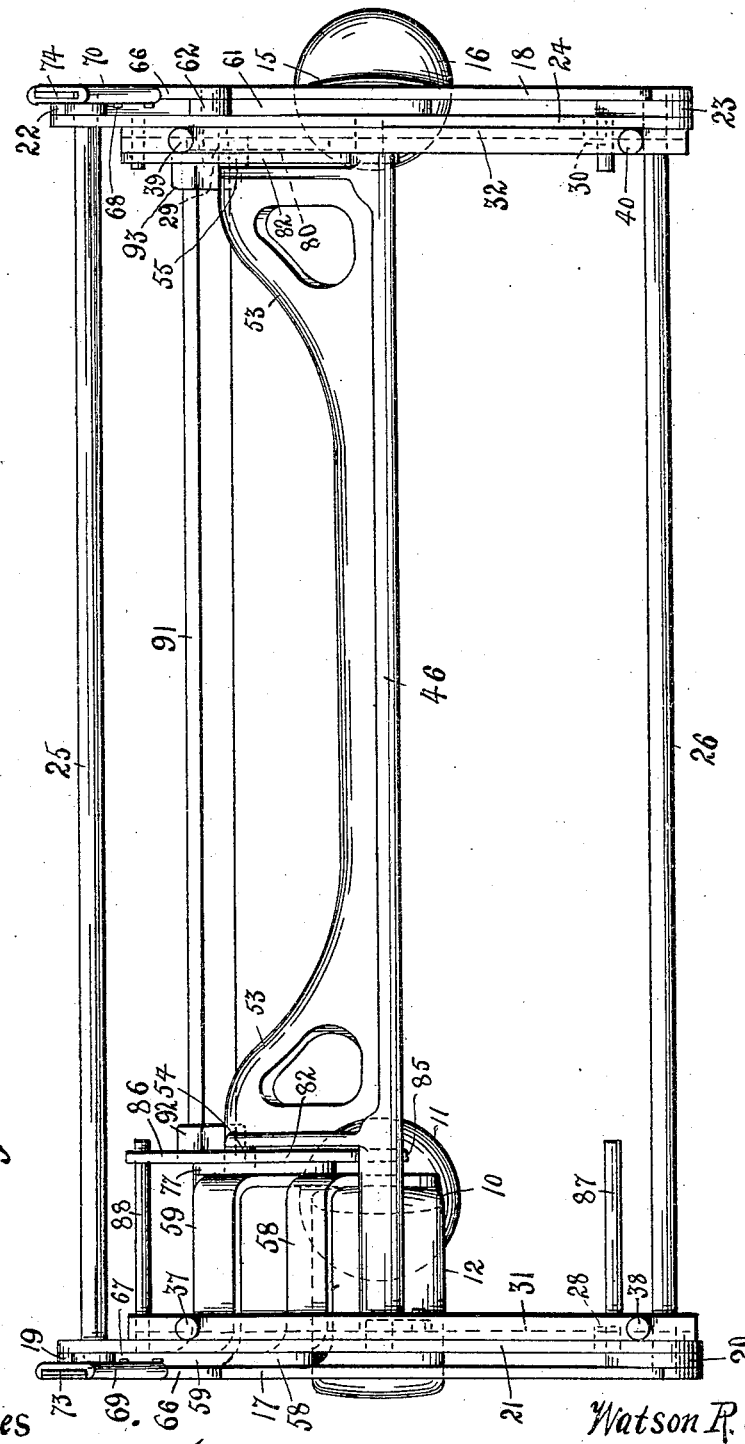

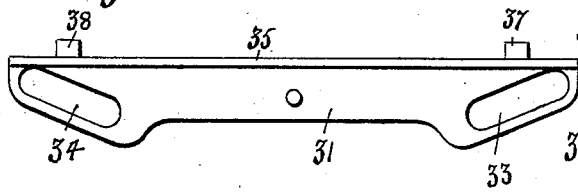
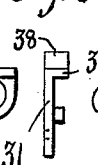
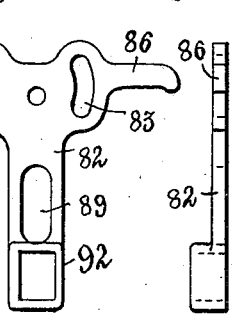
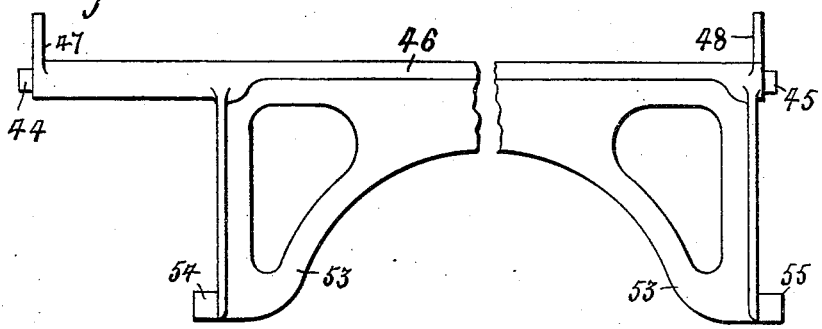
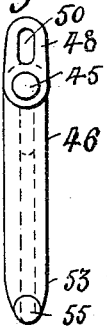
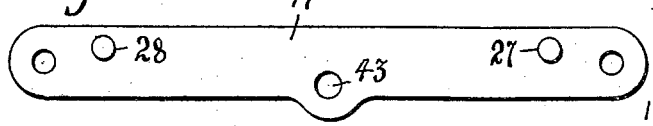
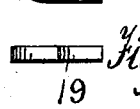
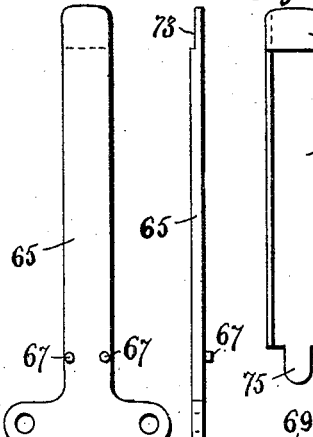
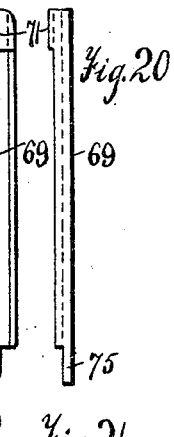
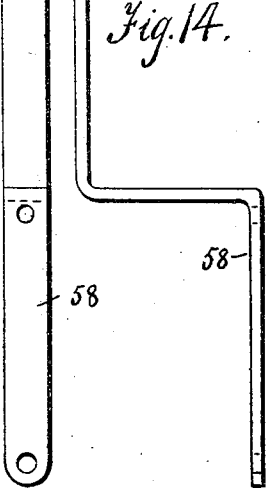

WATSON R. SMITH AND JAMES A. SANFORD, OF JACKSON, MICHIGAN, ASSIGNORS TO JACKSON CUSHION SPRING CO., OF JACKSON, MICHIGAN, A CORPORATION.

RAILWAY-CAR SEAT.

935,700.  Specification of Letters Patent.  Patented Oct. 5, 1909.

Application filed January 30, 1908. Serial No. 413,443.

*To all whom it may concern:*

Be it known that we, WATSON R. SMITH and JAMES A. SANFORD, citizens of the United States, residing at Jackson, in the county of Jackson and State of Michigan, have invented certain new and useful Improvements in Railway-Car Seats, of which the following is a specification.

This invention relates to seats of railway cars, more particularly to devices of this class which are reversible in position to enable the passenger to face in either direction, and has for one of its objects to provide a simply constructed device of this character whereby the back of the seat may be reversed in position and the seat portion elevated at the forward edge simultaneously with the reversal of the back.

Another object of the invention is to provide a device of this character wherein a reversible foot rest is included, and the foot rest locked in position automatically at the same time that the back is reversed and the seat portion adjusted vertically.

With these and other objects in view, the invention consists in certain novel features of construction as hereinafter shown and described and specifically pointed out in the claims, and in the drawings employed for illustrating the invention is shown the preferred form of the embodiment thereof, and in the drawings thus employed, Figure 1 is a transverse sectional elevation looking toward the wall or car side end. Fig. 2 is a side elevation of the lower portion of the device looking from the wall or car side end of the device. Fig. 3 is a front elevation. Fig. 4 is a plan view with the seat back and seat removed. Fig. 5 is a side elevation of one of the seat supporting members, and Fig. 6 is an end elevation of the same. Fig. 7 is a side elevation of one of the foot rest brackets, and Fig. 8 is an edge view of the same. Fig. 9 is a fore-shortened side elevation of the main connecting member, and Fig. 10 is an end elevation of the same. Fig. 11 is a side elevation of one of the inner coupling plates of the main standards detached, and Fig. 12 is an end elevation of the same. Fig. 13 is a side elevation of one of the radius bars, and Fig. 14 is an edge view of the same. Fig. 15 is a side view of one of the spacer blocks of the pedestals, and Fig. 16 is a plan view of the same. Fig. 17 is a side elevation of one of the seat back supporting members, and Fig. 18 is an edge view of the same. Fig. 19 is a side elevation, Fig. 20 is an edge view, and Fig. 21 is a plan view of the seat back bracket or guide.

The improved device comprises two pedestals adapted to be attached to the floor of the car, one of the pedestals being formed with an offset to enable it to embrace the usual heating pipes which are disposed next to the side of the car, the pedestals being otherwise duplicates of each other. The pedestal which comes next to the side of the car comprises a lower vertical portion 10 having an enlarged foot or base 11 and with an offset 12 and an upper vertical portion 13, the offset providing for the location of the usual heating pipes, indicated at 14. The other pedestal comprises a vertical portion 15 and base 16, the pedestal 15—16 coming next to the aisle in the car. Extending transversely of the vertical portion 13 of the side wall pedestal is an outer transverse plate 17, the plate being preferably integral with the pedestal and with transverse apertures at its ends, and likewise extending transversely of the aisle pedestal 15—16 is a similar outer transverse plate 18 also with transverse apertures at its ends. Spaced from the plate 17 by stop lugs 19—20 is an inner transverse plate 21. Spaced from the plate 18 by stop lugs 22—23 is an inner transverse plate 24, the stop lugs 19—20 and the plate 21 being pierced by transverse apertures in alinement with the apertures in the plate 17, while the stop lugs 22—23 and plate 24 are likewise pierced with transverse apertures corresponding to the apertures in the plate 18, and connecting the plates 17—21 and their stop lugs 19—20 and the plates 18—24 and their stop lugs 23 are tie rods 25—26, the ends of the tie rods being riveted or otherwise suitably secured through the apertures in the plates and stop lugs, as shown. By this means the two pedestals and their said combined spacing and stop lugs are firmly united and held in position, as will be obvious.

The plate 17 is provided with spaced projecting studs 27—28, while the plate 24 is likewise provided with corresponding projecting studs, indicated at 29—30, and bearing against the inner faces of the plates 17—24 are seat supporting plates 31—32, the latter plates provided with reversely arranged oblique slots 33—34 bearing, respectively, over the pins 27—28—29—30. It will be understood that each of the plates 31—32 is provided with a pair of the oblique slots, one pair only being shown for illustration.

The plates 31—32 are provided at their upper edges with inwardly extending flanges 35—36, and extending upwardly from these flanges are studs 37—38—39—40, the studs adapted to enter cavities in the lower or base member 41 of the seat 42, the seat thus being held from lateral movement, while at the same time readily removable when lifted upwardly.

The plates 21—24 are provided with central sockets, one of which is indicated at 43 in Fig. 11, and swingingly engaging these sockets are studs 44—45 extending from the ends of a connecting or coupling member 46, the coupling member having upwardly extending arms 47—48 having slots 49—50 through which pins 51—52 extending from the plates 31—32 project, as shown, so that when the member 46 is oscillated upon its bearings 44—45, the plates 31—32 will be correspondingly moved by the action of the arms 47—48 upon the pins 51—52 and likewise move the seat 42 with them, the slots 33—34 causing the ends of the seat to be alternately elevated and depressed, as hereafter explained.

The member 46 is provided with a depending web 53 with studs 54—55 extending from its ends, as shown in Fig. 9, the object to be hereafter explained.

Pivoted at 56—57 to the inner face of the vertical pedestal portion 10 are radius bars 58—59, and pivoted at 60 to the inner face of the vertical pedestal portion 15 are radius bars 61—62, the radius bars 58, 59 extending upwardly between the transverse plates 17—21, while the radius bars 61—62 extend upwardly between the plates 18—24, and are movable, respectively, forwardly and backwardly within these spaces, their movements being limited by the aforesaid lugs 19—20—22—23, as clearly shown in Figs. 1 and 2. Pivoted at 63—64 to the upper ends of the radius bars 58—59 and above the plates 17—21 is a seat back supporting member 65, and likewise pivoted to the upper ends of the radius bars 61—62 is a similar back supporting member 66, the pivots between the radius bars and the back supporting members being spaced a greater distance than the pivots 56—57—60 by which the lower ends of the several radius bars are supported, so that the inclination of the seat back will be less than the inclination of the radius bars, as hereafter explained.

The back supporting members 65—66 are provided, respectively, with spaced guide studs 67—68, and slidably disposed upon the members 65—66 are seat engaging plates 69—70, these latter plates having spaced guide ribs at their edges bearing against the edges of the members 65—66, while the members 69—70 are likewise provided with transverse webs 71—72 forming a socket to fit over the upper reduced ends 73—74 of the members 65, 66, while the lower ends of the plates 69—70 are likewise reduced transversely to fit between the studs 67—68, as shown. The back 76 is connected between the plates 69—70, and when thus connected is readily coupled to the members 65—66 by simply passing the members 69—70 with their guide ribs over the members 65—66 with the webs 71—72 fitting over the reduced portions 73—74 and the reduced portions 75. The back 76 is thus readily attachable to or removable from the members 65—66 and the parts associated therewith.

As before stated the pivots 63—64 are spaced farther apart than the pivots 66—67, so that when the radius bars are swung from side to side the seat back 76 will be caused to assume an inclination less than the inclination of the radius bars, so that the radius bars may be caused to swing to the extreme limit of the space provided for them between the spaced plates, while the seat 76 will be caused to assume the proper angle relative to the seat. It will also be noted that when the back 76 is swung from side to side to reverse its position, the arms 47—48 will cause the seat 42 to be likewise moved to a limited extent and the edge, which for the time being is the front edge, elevated to the requisite extent to provide a comfortable seat for the occupant, the change of position of the seat being automatically accomplished, as will be obvious.

Swingingly coupled to the radius bars 58—59 intermediate their ends is a small plate 77, the pivots 78—79 of the plate 77 projecting beyond the face of the coupling plate, while the radius bars 61—62 are correspondingly coupled by a similar plate 80, the pivots of this latter plate likewise extending beyond the face of the plate.

Pivoted at 81 to the center of the plate 77 is a foot rest supporting bracket 82, this bracket having segmental slots 83—84 fitting over the pins 78—79, and likewise provided with extending ends 85—86, the terminals of the projections 85—86 depending slightly below the lower line of the projections, as shown, and adapted to engage locking pins 87—88 projecting from the transverse plate 21. The bracket 82 is also provided with a longitudinal slot 89 in which the stud 54 of the web portion 53 of the connecting member 46 projects. The plate 80 of the radius bars 61—62 is likewise provided with a central stud corresponding to the stud 81, and upon this stud a corresponding foot rest supporting bracket 90 is swingingly mounted, the bracket 90 having segmental slots corresponding to the segmental slots 83—84 of the bracket 82 and with projections corresponding to the projections 85—86 and with depending terminals adapted to alternately engage with projecting locking pins or projections corresponding to the pins 87—88, the latter pins projecting from the pedestal plate 24.

The foot rest 91 is usually a wooden bar and in the present instance it has its ends fitted in the sockets 92—93 in the lower ends of the swinging brackets 82—90. These swinging brackets 82—90 being pivoted at 81 to the plates 77 which couple the radius bars 58—59, and the latter being pivoted at 56—57 to the pedestals 10—11, they are caused to move to opposite sides of the seat whenever the radius bars are shifted. To shift the radius bars to opposite sides of the seat, it is only necessary to shift the back 76 accordingly, the back being mounted upon the back supporting members 65, which latter are connected at 63—64 to the radius bars. When the back is at one side of the seat, the depending terminals of the projecting portions 86 of the swinging brackets 82—90 are in engagement with the pins 88 of the side members 21 of the chair supporting means, as shown in Fig. 1, and pressure of the foot of the occupant in the next seat in the rear will not cause disengagement of the projecting portions 86 of the swinging brackets from the pins 88, and this same characteristic is true of the engagement of the projecting portions 85 of the swinging elements when said latter portions are engaged with the pins 87 of said side plates 21, said projecting portions 85 engaging over said pins 87 when the back 76 is shifted from the position shown in Fig. 1 to the opposite side of the seat. The swinging brackets 82—90 move together by virtue of the connecting member 46, the latter being fulcrumed upon its bearings 44—45 and having pivotal and slidable connection at 54 in the slots 89 of the swinging brackets 82—90. By this simple arrangement, the foot rest will be automatically locked at opposite sides of the seat, and while the locking means effectually performs its function, the foot rest and swinging brackets may be readily released when the back is shifted. Further, the occupant of one seat will not be annoyed or inconvenienced by the pressure of the foot upon the foot rest by the occupant in a rear chair.

Any form of upholstering or cushioning may be employed in the seat and back. By this simple arrangement a very complete and convenient construction is produced whereby the back portion may be readily reversed, the forward end of the seat elevated to the requisite extent, and the foot rest likewise transferred with the back and locked in its position, so that pressure applied thereto will not be imparted to the seat back of said supporting device.

While we have shown and described the preferred form of mechanism to illustrate the embodiment of the invention, we do not desire to be limited thereto, as changes may be made in the details of construction within the scope of the appended claims without departing from the principle of the invention or sacrificing any of its advantages.

Having thus described the invention, what is claimed as new is:—

1. In a car chair, a supporting means for the chair, a seat, a shiftable back supporting means, a back secured to the back supporting means, a foot rest, swinging elements secured to and relying for their support upon said back supporting means and carrying the foot rest, the swinging elements being confined wholly beneath the seat and being movable under the influence of the back to shift the foot rest to opposite sides of the chair according to the direction of movement of the back.

2. In a car chair, a supporting means for the chair, a seat, means for movably supporting the seat, a shiftable back supporting means, a back secured to the back supporting means, a foot rest, swinging elements secured to and relying for their support upon said back supporting means and carrying the foot rest, the swinging elements being confined wholly beneath the seat and being movable under the influence of the back to shift the foot rest to opposite sides of the chair according to the direction of movement of the back, and a member pivotally secured to said movable seat supporting means and also pivotally secured to said swinging elements whereby the seat is moved simultaneously with the swinging elements when the back is shifted.

3. In a car chair, a supporting means for the chair, a shiftable back supporting means, a back carried by the shiftable back supporting means, a movably mounted seat, a movable supporting means for the seat, a foot rest, swinging elements secured to and relying for their support upon said back supporting means, said swinging elements carrying the foot rest and being movable under the influence of the back to shift the foot rest to opposite sides of the chair according to the direction of movement of the back, a member pivotally secured to said seat supporting means and also pivotally secured to said swinging elements whereby the seat is moved simultaneously with the swinging elements when the back is shifted.

4. In a car chair, a supporting means for the chair, a back, shiftable back supporting means for the back shiftable to opposite sides of the seat of the chair, a foot rest, swinging elements mounted upon said back supporting means and carrying the foot rest, each swinging element having a slot, and a connecting member carried by the chair supporting means and having projections forming bearings for engagement in the slots of the swinging elements, whereby said swinging elements and said connecting member may be swung with the shiftable back.

5. In a car chair, a supporting means, a car seat back shiftable to opposite sides of the seat of the chair, a foot rest, swinging elements carrying the foot rest, said elements being movable under the influence of the back to shift the foot rest to opposite sides of the seat, each swinging element having oppositely disposed projecting parts provided with depending portions, and oppositely disposed pairs of elements projecting from said supporting means for engagement with the depending portions of said projecting parts of the swinging elements to effect a locking of the foot rest in either of its positions.

6. In a car chair, spaced pedestals having outer transverse plates at their upper ends, inner transverse plates parallel to said outer transverse plates, and spaced therefrom and provided with spaced studs, seat supports having reversely disposed oblique slots engaging said studs, a connecting member swinging between said inner and outer plates, coupling means between said seat supports and connecting member, radius bars swinging from said pedestals and extending between said inner and outer plates, seat back supports connected to said radius bars, a foot rest, means for movably connecting said foot rest to said radius bars, and means for connecting said swinging connecting member to said foot rest connecting means.

7. In a car chair, spaced pedestals having transverse outer plates at their upper ends, inner transverse plates parallel to said transverse plates and spaced therefrom and provided with spaced studs, seat supports having reversely disposed oblique slots engaging said studs, a connecting member swinging between said inner and outer plates, coupling means between said seat supports and connecting member, radius bars swinging from said pedestals and extending between said inner and outer transverse plates, seat back supports connected to said radius bars, brackets swinging from said radius bars and partaking of their motion, a foot rest carried by said brackets, connecting means between said brackets and swinging connecting member, and means whereby said brackets are locked in either position of said seat supporting means and seat back supporting means.

8. In a car chair including spaced pedestals carrying spaced studs, seat supports having reversely disposed oblique slots engaging said studs, a connecting member swinging between said pedestals, coupling means between said seat supports and swinging connecting member, radius bars swinging from said pedestals, seat back supports connected to said radius bars, a foot rest, means for movably connecting said foot rest to said radius bars, and means for connecting said swinging connecting member to said foot rest connecting means.

9. In a car chair including spaced pedestals having laterally directed locking projections, seat supports movably associated with said pedestals, a connecting member swinging between said pedestals, coupling means between said seat supports and said swinging connecting member, radius bars swinging from said pedestals, seat back supports connected to said radius bars, brackets swingingly associated with said radius bars and partaking of their motion and provided with projections adapted to alternately engage said locking projections, a foot rest carried by said brackets, and connecting means between said brackets and swinging connecting member.

10. In a car chair including spaced pedestals having laterally directed locking projections, seat supports movably connected to said pedestals, a connecting member swinging between said pedestals coupling means between said seat supports and swinging connecting member, radius bars swinging from said pedestals, seat back supports connected to said radius bars, plates movably connected to said radius bars intermediate their ends, brackets swinging from said plates and provided with projections adapted to alternately engage said locking projections, a foot rest carried by said brackets, and connecting means between said brackets and swinging connecting member.

11. In a car chair including spaced pedestals having laterally directed locking projections, seat supports movably connected to said pedestals, a connecting member swinging between said pedestals coupling means between said seat supports and swinging connecting member, radius bars swinging from said pedestals, seat back supports connected to said radius bars, plates movably connected to said radius bars intermediate their ends, and with laterally extending pins, brackets swinging from said plates and provided with segmental slots bearing over said pins and with projections adapted to alternately engage said laterally directed locking projections, a foot rest carried by said brackets, and connecting means between said brackets and swinging connecting member.

12. In a car chair including spaced pedestals having laterally directed locking projections, seat supports adjustably connected to said pedestals, a swinging connecting member extending between said pedestals, coupling means between said swinging connecting member and seat supports, radius bars swinging from said pedestals, seat back supports movably connected to said radius bars, brackets swingingly associated with said radius bars and provided with projections adapted to alternately engage said locking projections, a foot rest carried by said brackets, and connecting means between said brackets and connecting member.

13. In a car chair including spaced pedestals having laterally directed locking projections, seat supports adjustably connected to said pedestals, a swinging connecting member extending between said pedestals, coupling means between said swinging connecting member and seat supports, radius bars swinging from said pedestals, seat back supports movably connected to said radius bars, plates movably connected to said radius bars and seat and with projecting stop pins, brackets swinging from said plates and provided with projections adapted to alternately engage said laterally directed locking projections and with segmental slots bearing over said stop pins, a foot rest carried by said brackets, and connecting means between said brackets and swinging connecting member.

14. In a car chair including spaced pedestals, seat supports adjustably connected to said pedestals, a connecting member swinging at one edge between said pedestals and with studs projecting from its free edge, coupling means between said swinging connecting member and seat supports, radius bars swinging from said pedestals, seat back supports movably connected to said radius bars, brackets swingingly associated with said radius bars and partaking of their motion and provided with longitudinal slots to receive the studs of said swinging connecting member, and a foot rest carried by said brackets.

15. In a car chair including spaced pedestals, seat supports adjustably connected to said pedestals, a connecting member swinging at one edge between said pedestals and with studs projecting from its free edge, coupling means between said swinging connecting member and seat supports, radius bars swinging from said pedestals, seat back supports movably connected to said radius bars, brackets swingingly associated with said radius bars and partaking of their motion and provided with longitudinal slots to receive the studs of said swinging connecting member, a foot rest carried by said brackets, and means whereby the foot rest is locked in either position of said seat supporting means and seat back supporting means.

16. In a car chair, spaced pedestals having transverse outer plates at their upper ends, inner transverse plates parallel to said outer transverse plates, stop lugs between each set of inner and outer plates, radius bars swinging from said pedestals and extending between said outer and inner transverse plates and bearing against said stop lugs, seat back supports pivoted to the upper ends of said radius bars, seat supports movably connected to said inner transverse plates, tie rods extending through said inner and outer plates and said stop lugs and connecting the pedestals, and means whereby said seat supports are adjusted simultaneously with the shifting of said seat back.

17. In a car chair, spaced pedestals having transverse outer plates at their upper ends, inner transverse plates parallel to said outer plates, tie rods connected to said inner and outer transverse plates for coupling the pedestals, seat supports movably connected to said inner plates, radius bars swinging from said pedestals and extending between said inner and outer transverse plates, seat back supports connected to said radius bars, a single foot rest, means for removably connecting said foot rest to said radius bars, and means operated by the movement of the radius bars for adjusting said seat supports whereby the foot rest is shifted and the seat adjusted simultaneously with the shifting of said seat back.

18. In a car chair, a supporting means having a pair of projections at its front and also having a pair of projections at its rear, a shiftable car seat back carried by said supporting means, a foot rest supporting means having swinging connection with said chair supporting means, a foot rest carried by the foot rest supporting means, and said foot rest supporting means being constructed and arranged for engagement with said pairs of projections of the supporting means to lock the foot rest alternately at the front and rear of the chair, the foot rest being extended substantially beneath the pair of projections in locking engagement with said foot rest supporting means.

19. In a car chair including spaced pedestals, seat supports connected to said pedestals, a swinging connecting member extending between said pedestals, coupling means between said swinging connecting member and said supports, elements swinging from said pedestals, seat back supports movably connected to said elements, a foot rest, means for connecting said foot rest to said elements, and means for connecting said swinging connecting member to said foot rest connecting means.

20. In a car chair including spaced pedestals, seat supports connected to said pedestals, a swinging connecting member extending between said pedestals, coupling means between said swinging connecting member and said supports, elements swingingly mounted upon said pedestals, seat back supports connected to said elements, brackets swinging from said elements and partaking of their motion, a foot rest carried by said brackets, connecting means between said brackets and swinging connecting member, and means whereby said brackets are locked in either position of their seat supporting means and the seat back supporting means.

21. In a car chair, a supporting means for the chair, a shiftable back supporting means, a back carried by the shiftable back supporting means, a movably mounted seat, a movable supporting means for the seat, a foot rest, swinging elements pivotally secured to and relying for their support upon said back supporting means and carrying the foot rest, said elements being movable under the influence of the back to shift the foot rest to opposite sides of the chair, a member pivotally secured to said seat supporting means and also pivotally and slidably secured to said swinging elements, whereby the seat is moved simultaneously with the swinging elements when the back is shifted.

22. In a car chair, a supporting means, radius bars secured to the supporting means, seat back supporting members connected to the radius bars, each seat back supporting member having spaced projections near its inner end, a seat back, members secured to the ends of the seat back and each having a reduced outer end for sliding engagement between the projections of the corresponding seat back supporting members and also having a socket at its outer end to embrace the outer end of the corresponding seat back supporting member.

23. In a car chair, a supporting means provided with pairs of locking projections, pairs of radius bars swinging from said supporting means, a seat, a seat back secured to the radius bars and shiftable to opposite sides of the seat, a member connected to each pair of radius bars with each of said members provided with a lateral projection at each end, a foot rest, swinging elements carrying the foot rest, said swinging elements being pivoted one upon each of the members which connect said radius bars and each member having slots to slidably embrace the lateral projections of said members, each swinging member also having projecting parts for engagement with the locking projections of the supporting means to effect a locking of the foot rest at opposite sides of the seat, said swinging elements also having other slots, a connecting member between said swinging elements pivotally secured to said supporting means and also pivotally mounted in the last mentioned slots of said swinging elements to effect a shifting of the foot rest when the seat back is shifted.

24. In a car chair, a supporting means having lateral projections, a seat, a seat back shiftable to opposite sides of the seat, a foot rest, swinging elements carrying the foot rest, connections between the swinging elements and the seat back whereby the foot rest may be shifted simultaneously with the seat back, said swinging elements being pivotally mounted and having projecting parts forming parts of locking means for coöperation with said lateral projections to effect a locking of the foot rest alternately in the front and rear of the seat.

25. In a car chair, a supporting means, movable supporting plates on the supporting means, a seat removably mounted upon said supporting plates, a seat back shiftable to opposite sides of the seat, a foot rest, swinging elements carrying the foot rest, said elements being movable under the influence of the back to shift the foot rest to opposite sides of the seat according to the direction of movement of the back, a coupling member between said swinging elements having pivotal and slidable connection with said supporting plates and also having pivotal and slidable connection with said swinging elements, and interchangeable connections between the swinging elements and the supporting means to lock the foot rest alternately in its shifted position.

26. In a car chair, a supporting means for the chair, pairs of radius bars swinging from said supporting means, a back secured to said radius bars, a foot rest, swinging elements pivotally secured to and relying for their support upon said radius bars and carrying the foot rest, said elements being movable under the influence of the back to shift the foot rest to opposite sides of the chair, and means to lock the foot rest at either side of the chair.

27. In a car chair, supporting means, radius bars pivotally secured to the supporting means, a back secured to said radius bars, a seat for the chair, means for movably mounting the seat, a foot rest, swinging members pivotally secured to the radius bars and carrying the foot rest, and a member pivotally connected to said seat supporting means and pivotally and slidably connected to said swinging elements, whereby the foot rest may be shifted to opposite sides of the seat and the seat supporting means operated upon swinging movement of the radius bars incident to a shifting of the seat back.

28. In a car chair, supporting means, radius bars pivotally secured to the supporting means, a back secured to said radius bars, a seat for the chair, means for movably mounting the seat and having lateral projections, a foot rest, swinging members pivotally secured to the radius bars and carrying the foot rest, a member pivotally mounted upon said lateral projections of the seat supporting means and pivotally and slidably connected to said swinging elements, whereby the foot rest may be shifted to opposite sides of the seat and the seat supporting means operated upon swinging movement of the radius bars incident to a shifting of the seat back, and means for locking the foot rest alternately at opposite sides of the seat.

29. In a car chair, a supporting means, movable supporting plates on the supporting means, said supporting means having a pair of depending portions at each side thereof, with each depending portion provided with a projection, a seat mounted upon said supporting plates, a seat back shiftable to opposite sides of the seat, a foot rest, swinging elements carrying the foot rest, a coupling member between said seat supporting plates and said swinging elements, whereby said plates may be operated and the swinging elements shifted under the influence of the back to shift the foot rest to opposite sides of the seat, said swinging elements being thrown into engagement alternately with a pair of said projections to lock the foot rest in its shifted positions.

30. In a car chair, a supporting means, pairs of radius bars secured to the supporting means, a seat back secured to the radius bars and shiftable with the latter to opposite sides of the chair, a member connecting each pair of radius bars, swinging elements pivotally mounted upon the members which connect said radius bars and movable with the latter to opposite sides of the chair, a foot rest carried by said swinging elements and means for locking the foot rest at opposite sides of the chair.

31. In a car chair, a supporting means, pairs of radius bars secured to the supporting means, a seat back secured to the radius bars and shiftable with the latter to opposite sides of the chair, a member connecting each pair of radius bars, swinging elements pivotally mounted upon the members which connect said radius bars and movable with the latter to opposite sides of the chair, a foot rest carried by said swinging elements, a member mounted upon the supporting means and having connection with said swinging elements whereby the swinging elements will be shifted together upon movement of the radius bars incident to shifting of the seat back, and means for locking the foot rest at opposite sides of the chair.

In testimony whereof we affix our signatures, in presence of two witnesses.

WATSON R. SMITH.
JAMES A. SANFORD.

Witnesses:
   JOHN W. KNIGHT,
   CLAUDE S. LARNED.